(12) United States Patent
Pawar et al.

(10) Patent No.: US 10,747,779 B2
(45) Date of Patent: Aug. 18, 2020

(54) TECHNOLOGIES FOR ACHIEVING SYNCHRONIZED OVERCLOCKING SETTING ON MULTIPLE COMPUTING DEVICES

(71) Applicant: Intel Corporation, Santa Clara, CA (US)

(72) Inventors: Sagar C. Pawar, Bangalore (IN); Prakash Pillai, Bangalore (IN); Raghavendra N, Bangalore (IN); Aneesh A. Tuljapurkar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/426,029

(22) Filed: May 30, 2019

(65) Prior Publication Data

US 2020/0125579 A1 Apr. 23, 2020

Related U.S. Application Data

(63) Continuation of application No. 15/481,733, filed on Apr. 7, 2017, now Pat. No. 10,318,547.

(51) Int. Cl.
| | |
|---|---|
| *G06F 15/16* | (2006.01) |
| *G06F 16/27* | (2019.01) |
| *G06F 1/04* | (2006.01) |
| *G06F 1/12* | (2006.01) |
| *G06F 1/3296* | (2019.01) |
| *G06F 1/324* | (2019.01) |
| *H04J 3/06* | (2006.01) |

(52) U.S. Cl.
CPC ............... *G06F 16/27* (2019.01); *G06F 1/04* (2013.01); *G06F 1/12* (2013.01); *G06F 1/324* (2013.01); *G06F 1/3296* (2013.01); *H04J 3/06* (2013.01)

(58) Field of Classification Search
CPC ... G06F 16/27; G06F 1/04; G06F 1/12; G06F 1/324; G06F 1/3296
See application file for complete search history.

*Primary Examiner* — Ryan J Jakovac
(74) *Attorney, Agent, or Firm* — Barnes & Thornburg LLP

(57) ABSTRACT

Technologies for synchronized overclocking setting between multiple networked computing devices include a master computing device and multiple slave computing devices communicating over a network. The master computing device establishes a connection with the slave computing devices. Establishing the connection may include synchronizing the slave computing devices with a master time clock of the master computing device. The master computing device determines its own overclocking setting and requests overclocking settings from the slave computing devices. The overclocking settings may include processor frequency, processor voltage, or other overclocking parameters. The master computing device determines a best overclocking setting from its own overclocking setting and the overclocking settings received from the slave computing device. The master computing device advertises the best overclocking setting to the slave computing devices. The slave computing devices may implement the best overclocking setting. Other embodiments are described and claimed.

20 Claims, 5 Drawing Sheets

TECHNOLOGIES FOR ACHIEVING SYNCHRONIZED OVERCLOCKING SETTING ON MULTIPLE COMPUTING DEVICES

CROSS-REFERENCE TO RELATED APPLICATION

The present application is a continuation application of U.S. application Ser. No. 15/481,733, entitled "TECHNOLOGIES FOR ACHIEVING SYNCHRONIZED OVERCLOCKING SETTING ON MULTIPLE COMPUTING DEVICES," which was filed on Apr. 7, 2017, and which issued as U.S. Pat. No. 10,318,547 on Jun. 11, 2019.

BACKGROUND

Manufacturers typically rate and sell processors at particular clock frequencies to meet consumer demand. Many processors may be overclocked to frequencies significantly greater than their manufacturer-rated clock frequency. Such overclocking may allow a user to gain additional performance of one or more computer components, such as the main processor or processor graphics, by increasing its operating speed.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
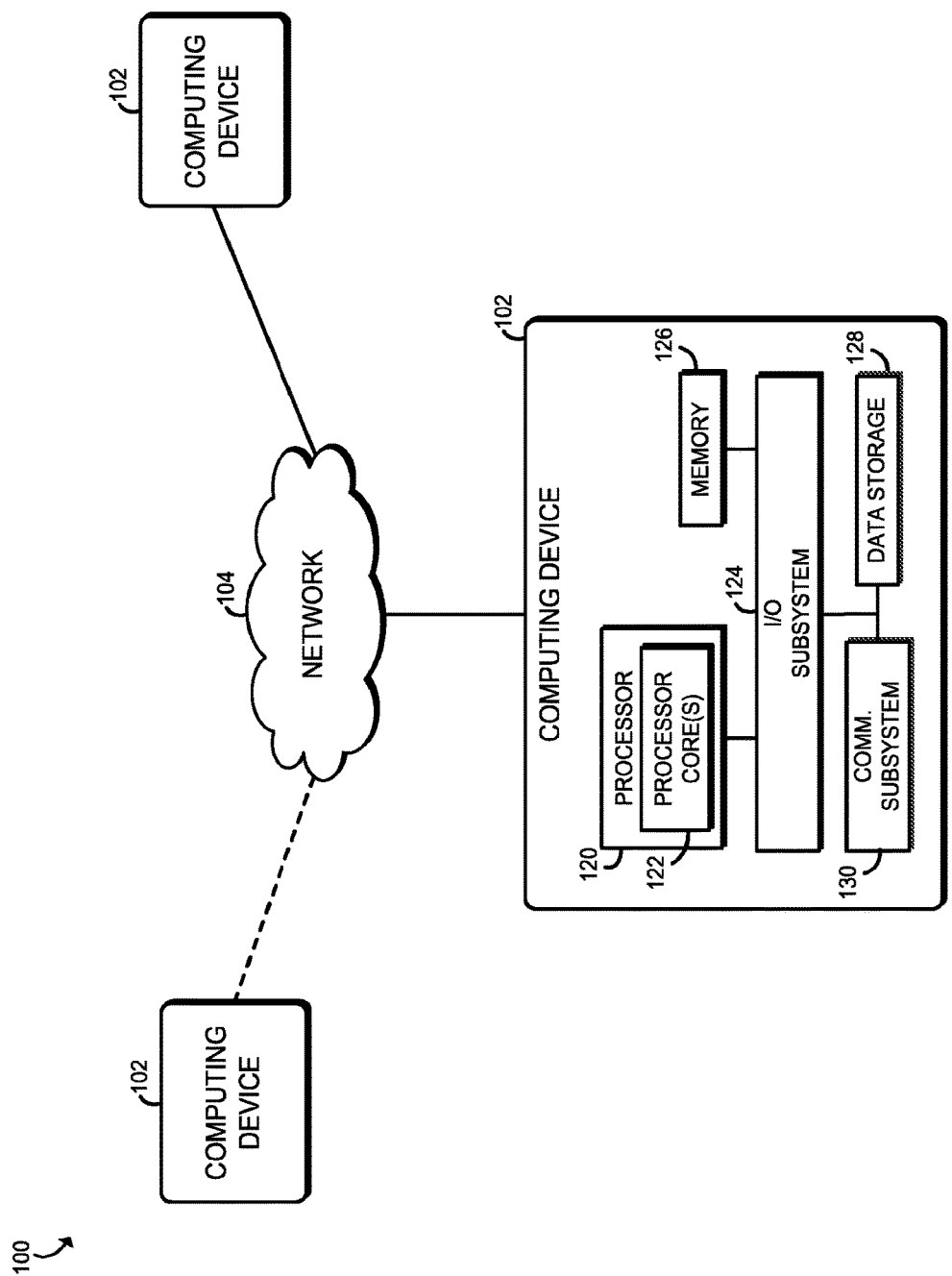
FIG. 1 is a simplified block diagram of at least one embodiment of a system for achieving synchronized overclocking setting on multiple computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for achieving synchronized overclocking setting between multiple computing devices includes a computing device 102 configured to communicate with one or more other computing devices 102 over a network 104. The computing devices 102 may perform one or more time synchronization protocols created by the Institute of Electrical and Electronics Engineers (IEEE) to synchronize the various time clocks across the network 104. As part of the time synchronization protocol, a master computing device 102 may be identified, and the other slave computing devices 102 may synchronize their time clocks to the master computing device 102. The master computing device 102 also receives overclocking settings from the slave computing devices 102, determines a best overclocking setting, and advertises the best overclocking setting to the slave computing devices 102. The master computing device 102 may command the slave computing devices 102 to implement the best overclocking setting and track overclocking settings of the slave computing devices 102. Thus, the system 100 may provide a stable network connection among all the computing devices 102 within the network 104 such that all computing devices 102 have a synchronized time clock and a synchronized performance level (i.e., synchronized overclocking setting) to efficiently render related content without any delay. Examples of such related content include, but are not limited to, interactive games, audio/video, and other content. For example, during multiplayer networked gaming, tightly synchronized overclocking settings for computing devices 102 among players may allow all computing devices 102 to be operated at their best performance level without time lag.

Each computing device 102 may be embodied as any type of computation or computing device capable of playing media and performing the functions described herein, including, without limitation, a tablet computer, a smartphone, a laptop computer, a notebook, desktop computer, a netbook, an Ultrabook™, a smart device, a personal digital assistant, a mobile Internet device, and/or other computing device. As shown in FIG. 1, an illustrative computing device 102 includes a processor 120, one or more processor core(s) 122, an input/output ("I/O") subsystem 124, a memory 126, a data storage device 128, and a communication subsystem 130. Of course, the computing device 102 may include other or additional components, such as those commonly found in a typical computing device, in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), multi-threaded processor, digital signal processor, microcontroller, or other processor or processing/controlling circuit. The illustrative processor 120 is a multi-core processor 120 having multiple processor cores 122. Each processor core 122 is an independent, general-purpose processing unit capable of executing programmed instructions. In particular, each processor core 122 executes instructions from a general-purpose instruction set architecture (ISA) such as IA-32 or Intel® 64.

Similarly, the memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In the illustrative embodiment, the computing device 102 may be configured to store overclocking setting data, historical overclocking setting data, and/or other data in the data storage device 128. As discussed in more detail below, the overclocking setting data may include multiple overclocking parameters.

The communication subsystem 130 may be embodied as any type of communication circuit, device, or collection thereof, capable of enabling communications between the computing device 102 and other devices (e.g., other computing devices 102). To do so, the communication subsystem 130 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the computing device 102 may also include one or more peripheral devices (not shown). The peripheral devices may include any number of additional peripheral or interface devices, such as other input/output devices, storage devices, and so forth. The particular devices included in the peripheral devices may depend on, for example, the type and/or configuration of the computing device 102.

The network 104 may be embodied as any type of network capable of facilitating communications between the multiple computing devices 102. For example, the network 104 may be embodied as, or otherwise include, a wired or wireless local area network (LAN), a wide area network (WAN), a cellular network, and/or a publicly-accessible, global network such as the Internet. As such, the network 104 may include any number of additional devices, such as additional computers, routers, and switches, to facilitate communications thereacross.

Figure 2:
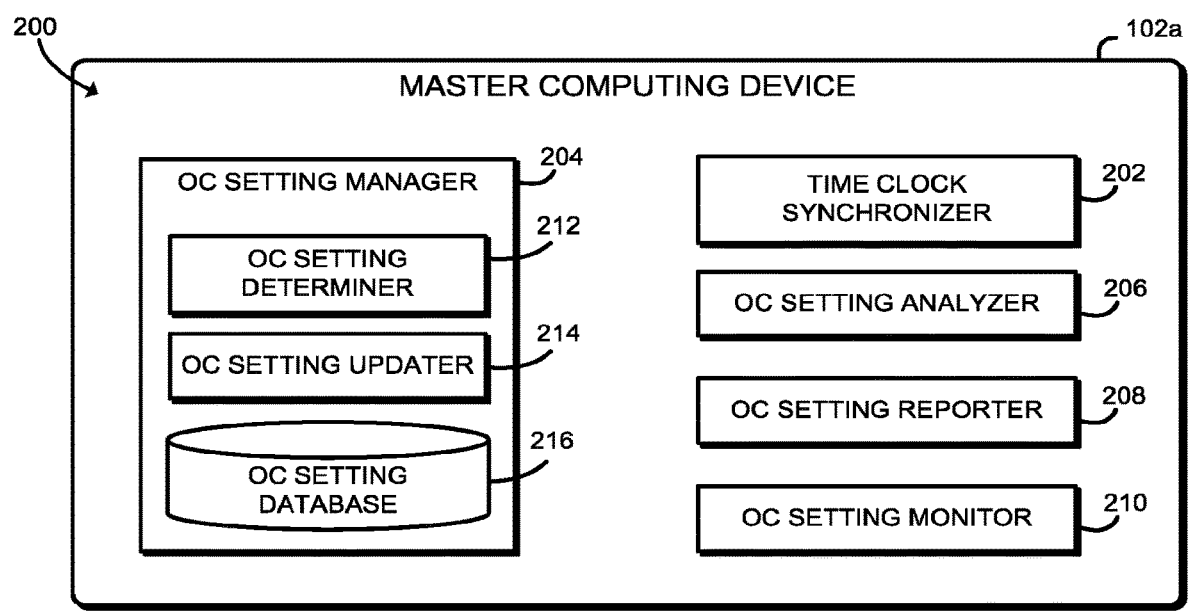
FIG. 2 is a simplified block diagram of at least one embodiment of an environment that may be established by a master computing device of the system of FIG. 1.

Referring now to FIG. 2, in use, a master computing device 102a establishes an environment 200. The illustrative environment 200 includes a time clock synchronizer 202, an overclocking setting manager 204, an overclocking setting analyzer 206, an overclocking setting reporter 208, and an overclocking setting monitor 210. The various components of the environment 200 may be embodied as hardware, firmware, software, or a combination thereof. As such, in some embodiments, one or more of the components of the environment 200 may be embodied as circuitry or collection of electrical devices (e.g., a time clock synchronizer circuit 202, an overclocking setting manager circuit 204, an overclocking setting analyzer circuit 206, an overclocking setting reporter circuit 208, and/or an overclocking setting monitor circuit 210). It should be appreciated that, in such embodiments, one or more of the time clock synchronizer circuit 202, the overclocking setting manager circuit 204, the overclocking setting analyzer circuit 206, the overclocking setting reporter circuit 208, and/or the overclocking setting monitor circuit 210 may form a portion of one or more of the processor 120, the I/O subsystem 124, the communication subsystem 130, and/or other components of the master computing device 102a. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the processor 120 or other components of the master computing device 102a.

The time clock synchronizer 202 is configured to establish a synchronized time clock among the master computing device 102a and multiple slave computing device(s) 102b. Specifically, the time clock synchronizer 202 is configured to synchronize a master time clock of the master computing device 102a with all slave clock(s) of the slave computing device(s) 102b within the network 104 in order to establish a connection between the master computing device 102a and the slave computing device(s) 102b. To do, the time clock synchronizer 202 determines a time clock of the master computing device 102a and identifies its time clock as the master time clock. It should be appreciated that the master time clock may be the best time clock among the computing devices 102 (e.g., the most accurate time clock). The time clock synchronizer 202 is configured to determine the master time clock using an algorithm consistent with a predetermined protocol, such as an IEEE protocol. In the illustrative embodiment, the clock synchronization is established in accordance with the IEEE 1588 protocol along with IEEE 802.1AS/LAN protocol. Thus, each computing device 102 within the network 104 determines its time clock, broadcasts it over the network 104, and determines which time clock is the best time clock among the computing devices 102 in the network 104.

The IEEE 1588 protocol describes a hierarchical master-slave architecture for time clock distribution. Under this architecture, all computing devices 102 are connected to a single network 104. Among these computing devices 102, a synchronization master computing device 102a is selected. For example, a computing device that has a time clock with the highest accuracy among the computing devices residing on the network 104 identifies its clock as a master time clock and declares itself as a master computing device 102a. In any case, the master computing device 102a is a source of a time synchronization reference and is configured to broadcast synchronization information to other slave computing device(s) 102b residing on its network 104, whereas the slave computing device 102b is a destination of the synchronization reference. It should be appreciated that the hierarchical master-slave architecture may change dynamically during the network communication among the computing devices 102 in the network 104. In other words, each computing device 102 in the network 104 is capable of functioning as the "master" or the "slave."

The time clock synchronizer 202 is further configured to periodically or continually broadcast the current master time clock to other slave clocks. It should be appreciated that the computing device with the master time clock (i.e., the master computing device 102a) may change over time within the network 104, and the time clock synchronizer 202 is configured to synchronize the master time clock and the slave time clocks. As such, the "master computing device" may change during the communication between the computing devices 102 residing in the same network 104. The time clock synchronizer 202 is configured to declare itself as a master computing device 102a and transmit the master time clock to the slave computing device(s) 102b within the network 104. The time synchronization standard IEEE protocols may be used to synchronize the time clock between the master computing device 102a and the slave computing devices 102b.

The overclocking setting manager 204 is configured to manage the overclocking setting of the master computing device 102a. The overclocking setting manager 204 is configured to determine an overclocking setting of the master computing device 102a, which is indicative of the best overclocking performance that can be achieved by the master computing device 102a. The overclocking setting includes one or more overclocking parameters. For example, the overclocking parameter may be an operating clock frequency of a processor, an operating voltage of a processor, a number of processor cores, a core ratio, a turbo status, or any other parameters that may affect the performance of the master computing device 102a. The overclocking setting manager 204 may determine a value or a range of each overclocking parameter, such that the overclocking setting as a whole can achieve the best performance possible by the master computing device 102a. It should be appreciated that the best overclocking performance may be achieved by controlling multiple overclocking parameters. For example, the overclocking setting manager 204 may maximize the operating clock frequency of a processor and minimize the operating voltage of a processor.

The overclocking setting manager 204 is further configured to adjust the overclocking setting of the master computing device 102a by updating the overclocking parameter(s) of the master computing device 102a based on the comparison of the overclocking setting and the best overclocking setting determined by the overclocking setting analyzer 206, as described below. If the best overclocking setting determined by the overclocking setting analyzer 206 is different from the present overclocking setting of the master computing device 102a, the overclocking setting manager 204 updates the overclocking parameter(s) in accordance with the best overclocking setting. In some embodiments, those functions may be performed by one or more sub-components, such as an overclocking setting determiner 212 and/or an overclocking setting updater 214.

As shown, the overclocking setting manager 204 further includes an overclocking setting database 216. The overclocking setting database 216 is configured to periodically or continually store the overclocking setting of the master computing device 102a and the best overclocking setting determined by the overclocking setting analyzer 206, which is further discussed below. In some embodiments, the overclocking setting database 216 may also store the overclocking setting(s) of the slave computing device(s) 102b received from each slave computing device 102b in the network 104.

The overclocking setting analyzer 206 is configured to determine the best overclocking setting among the overclocking setting of the master computing device 102a determined by the overclocking setting manager 204 and the overclocking settings of the slave computing devices 102b received from each slave computing device 102b. The best overclocking setting may be indicative of the best possible overclocking performance that can be achieved among the master computing device 102a and all the slave computing devices 102b in the network 104. To do so, the overclocking setting analyzer 206 may compare the overclocking setting of the master computing device 102a and the overclocking settings of the slave computing devices 102b.

In the illustrative embodiment, the overclocking setting includes one or more overclocking parameters. The overclocking setting analyzer 206 may compare each overclocking parameter of the master computing device 102a with the corresponding overclocking parameter of the slave computing device 102b. In some embodiments, the overclocking setting analyzer 206 may select an overclocking setting that has the best overall overclocking parameters. In other embodiments, the overclocking setting analyzer 206 may select best overclocking parameters among the overclocking settings. To do so, the overclocking setting analyzer 206 may compare a value or a range of each overclocking parameter of the overclocking setting of the master computing device 102a to a value or a range of the corresponding overclocking parameter of the overclocking setting of each slave computing device 102b. The best value or range of the overclocking parameter may be the maximum or minimum value or range of the overclocking parameter depending on the overclocking parameter. For example, the overclocking setting manager 204 may maximize the operating clock frequency of a processor but minimize the operating voltage of a processor to reduce heat production.

The overclocking setting reporter 208 is configured to advertise the best overclocking setting determined by the overclocking setting analyzer 206 to the slave computing device(s) 102b. In some embodiments, the overclocking setting reporter 208 may further transmit a request to the slave computing device(s) 102b to implement the best overclocking setting advertised to the slave computing device(s) 102b.

The overclocking setting monitor 210 is configured to monitor the overclocking performance of the master computing device 102a and the overclocking performance of the slave computing device(s) 102b in response to advertising the best overclocking setting. In some embodiments, the overclocking setting monitor 210 may further determine whether each slave computing device 102b has implemented the best overclocking setting advertised to the slave computing device 102b. To do so, the overclocking setting monitor 210 may periodically or continually monitor the best overclocking setting advertised to the slave computing device(s) 102b and current and previous overclocking settings of the slave computing device(s) 102b that are stored in the overclocking setting database 216.

Figure 3:
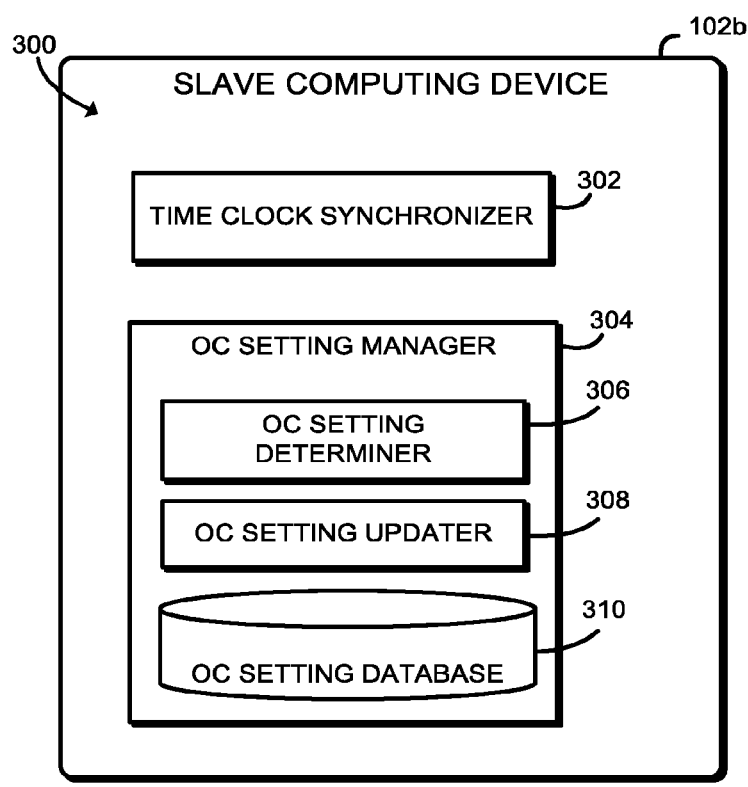
FIG. 3 is a simplified block diagram of at least one embodiment of an environment that may be established by a slave computing device of the system of FIG. 1.

Referring now to FIG. 3, in use, the slave computing device 102b establishes an environment 300. The illustrative environment 300 includes a time clock synchronizer 302 and an overclocking setting manager 304. The various components of the environment 300 may be embodied as hardware, firmware, software, or a combination thereof. As such, in some embodiments, one or more of the components of the environment 300 may be embodied as circuitry or collection of electrical devices (e.g., a time clock synchronizer circuit 302 and/or an overclocking setting manager circuit 304). It should be appreciated that, in such embodiments, one or more of the time clock synchronizer circuit 302 and/or the overclocking setting manager circuit 304 may form a portion of one or more of the processor 120, the I/O subsystem 124, the communication subsystem 130, and/or other components of the slave computing device 102b. Additionally, in some embodiments, one or more of the illustrative components of the environment 300 may form a portion of another component and/or one or more of the illustrative components may be independent of one another. Further, in some embodiments, one or more of the components of the environment 300 may be embodied as virtualized hardware components or emulated architecture, which may be established and maintained by the processor 120 or other components of the slave computing device 102b.

The time clock synchronizer 302 is configured to synchronize the slave computing device 102b with the master time clock of the master computing device 102a. To do so, the time clock synchronizer 302 is configured to establish a connection between the slave computing device 102b and the master computing device 102a. The time clock synchronizer 302 is configured to adjust the slave time clock to synchronize to the master time clock in response to receiving the master time clock from the master computing device 102a.

The overclocking setting manager 304 is configured to manage the overclocking setting of the slave computing device 102b. The overclocking setting manager 304 is configured to determine an overclocking setting of the slave computing device 102b, which is indicative of a best overclocking performance that can be achieved by the slave computing device 102b. As discussed above, the overclocking setting includes one or more overclocking parameters. For example, the overclock parameter may be an operating clock frequency of a processor, an operating voltage of a processor, a number of processor cores, a core ratio, a turbo status, or any other parameter that may affect the performance of the slave computing device 102b. The overclocking setting manager 304 may determine a value or a range of each overclocking parameter, such that the overclocking setting as a whole can achieve the best performance possible by the slave computing device 102b. It should be appreciated that the best overclocking performance may be achieved by a various methods. It should be appreciated that the best overclocking performance may be achieved by controlling multiple overclocking parameters. For example, the overclocking setting manager 304 may maximize the operating clock frequency of a processor and minimize the operating voltage of a processor.

In some embodiments, the overclocking setting manager 304 may receive a request from the master computing device 102a for the overclocking setting of the slave computing device 102b. Moreover, in some embodiments, the overclocking setting manager 304 may also receive a request from the master computing device 102a to enable an overclocking mode in order to for the slave computing device 102b to determine the overclocking setting of the slave computing device 102b.

The overclocking setting manager 304 is further configured to adjust the overclocking setting of the slave computing device 102b by updating the overclocking parameter(s) of the slave computing device 102b based on the comparison of the overclocking setting and the best overclocking setting determined by and received from the master computing device 102a, as described below. If the best overclocking setting received from the master computing device 102a is different from the present overclocking setting of the slave computing device 102b, the overclocking setting manager 304 updates the overclocking parameter(s) in accordance with the best overclocking setting. In some embodiments, the overclocking setting manager 304 may receive a request from the master computing device 102a to implement the best overclocking setting received by the slave computing device 102b. In such embodiment, the overclocking setting manager 304 may update the overclocking parameter(s) of the slave computing device 102b in response to the implementation request from the master computing device 102a. In some embodiments, the overclocking setting manager 304 may transmit an acknowledgement to the master computing device 102a indicating that the best overclocking setting was successfully implemented in the slave computing device 102b. In some embodiments, those functions may be performed by one or more sub-components, such as an overclocking setting determiner 306 and/or an overclocking setting updater 308.

As shown, the overclocking setting manager 304 further includes an overclocking setting database 310. The overclocking setting database 310 is configured to periodically or continually store the overclocking setting of the slave computing device 102b and the best overclocking setting received from the master computing device 102a, which is further discussed below. In some embodiments, the overclocking setting database 310 may also store a status of whether the best overclocking setting determined by and received from the master computing device 102a has been successfully implemented in the slave computing device 102b.

Figure 4:
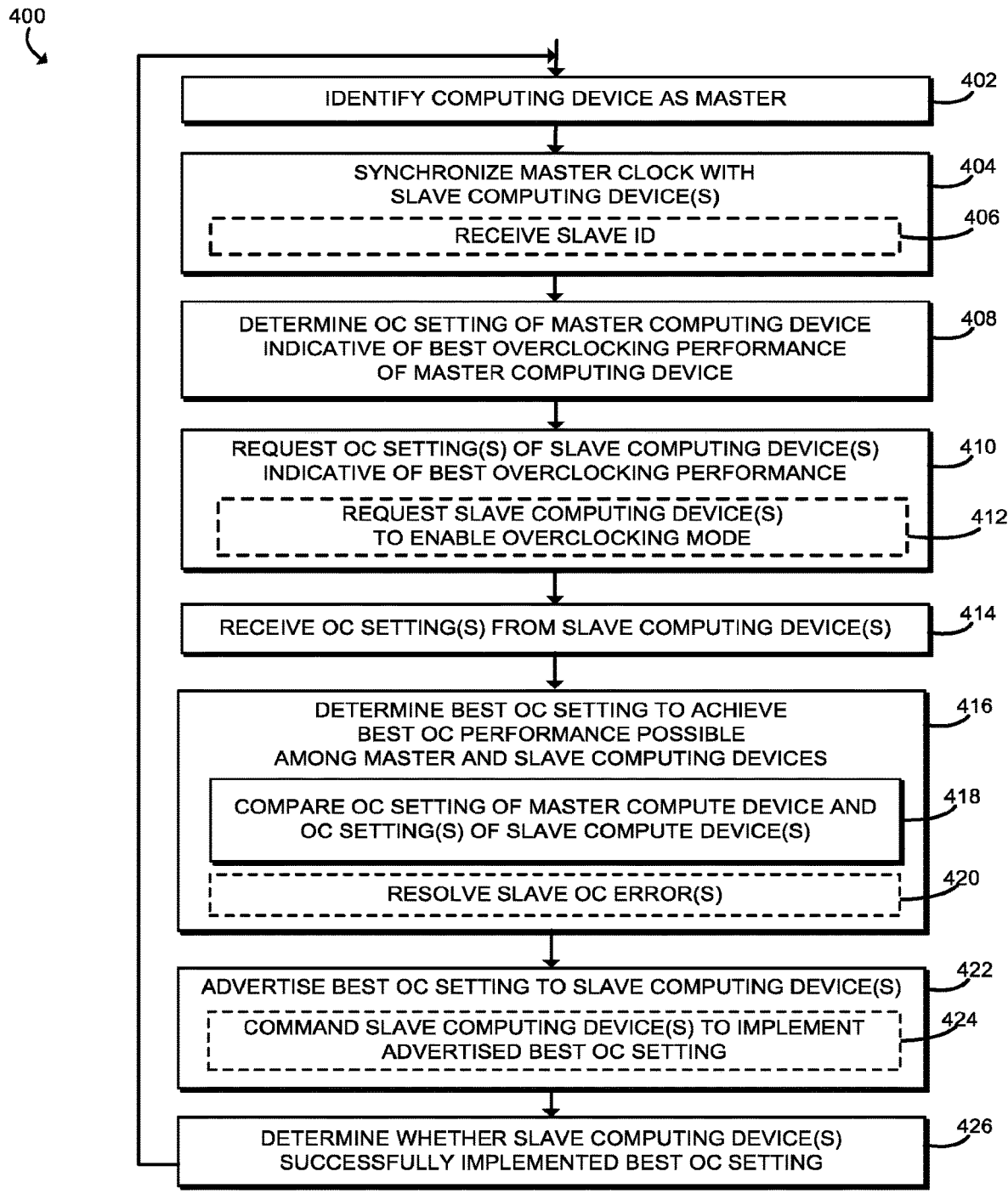
FIG. 4 is a simplified flow diagram of at least one embodiment of a method for achieving synchronized overclocking setting that may be executed by the master computing device of FIGS. 1 and 2.

Referring now to FIG. 4, in use, the master computing device 102a may execute a method 400 for determining and advertising a best overclocking setting to the slave computing device(s) 102b to achieve best common performance level. The method 400 begins to establish timing synchronization between the computing devices 102 within the same network 104. To do so, in the illustrative embodiment, in block 402 the computing device 102 identifies itself as a master computing device 102a. The master computing device 102a may, for example, determine that it has the most accurate time clock among the computing devices 102 of the network 104 or that it has the highest pre-determined priority of the computing devices 102 of the network 104. The master computing device 102a may be identified using a time synchronization protocol such as the precision time protocol (PTP) IEEE 1588 and/or IEEE 802.1AS/LAN.

In block 404, the master computing device 102a broadcasts and synchronizes its master time clock with slave computing device(s) 102b within the network 104. The master computing device 102a uses a time synchronization protocol such as the PTP IEEE 1588 and/or IEEE 802.1AS/LAN. It should be appreciated that, in some embodiments, other time synchronizing protocols may be used to send and receive time clocks of the master computing devices 102a and slave computing devices 102b within the network 104. It should also be appreciated that in some embodiments, in block 406, the master computing device 102a may receive an identification of the slave computing device 102b from each slave computing device 102b. The identification of the slave computing device 102b may allow the master computing device 102a to monitor or track an overclocking setting of the slave computing device 102b.

Once the PTP communication is established between the master computing device 102a and all the slave computing device(s) 102b according to IEEE 1588 and/or IEEE 802.1AS/LAN, the method 400 advances to block 408 in which the master computing device 102a determines an overclocking setting of the master computing device 102a. The overclocking setting of the master computing device 102a is indicative of a best overclocking performance that can be achieved by the master computing device 102a. The overclocking setting includes one or more overclock parameters. For example, the overclock parameters may include an operating clock frequency of a processor, an operating voltage of a processor, a number of processor cores, a core ratio, a turbo status, or any other parameter that may affect the performance of the master computing device 102a. The best value or range of the overclocking parameter may be the maximum or minimum value or range of the overclocking parameter depending on the overclocking parameter. It should be appreciated, however, in some embodiments, the best value or range of the overclocking parameter may not be the maximum or minimum value or range to provide a buffer to minimize possible system errors.

After determining the overclocking setting of the master computing device 102a, in block 410 the master computing device 102a requests each slave computing device 102b to transmit an overclocking setting of the corresponding slave computing device 102b. It should be appreciated that, in some embodiments, in block 412 the master computing device 102a may transmit a request to a slave computing device 102b to enable an overclocking mode of that slave computing device 102 before or as a part of transmitting a request for the overclocking setting of the slave computing device 102b to the slave computing device 102b.

In block 414, the master computing device 102a receives an overclocking setting from each slave computing device 102b. As described above, the overclocking setting may include one or more overclocking parameters, such as an operating clock frequency of a processor, an operating voltage of a processor, a number of processor cores, a core ratio, a turbo status, or any other parameters that may affect the performance of the corresponding slave computing device 102b.

In block 416, the master computing device 102a determines the best overclocking setting selected among the overclocking setting of the master computing device 102a and the overclocking setting(s) received from the slave computing device(s) 102b. The master computing device 102a may determine the best overclocking setting using any appropriate overclocking criteria. For example, the master computing device 102a may determine the overclocking setting with the highest absolute performance, the overclocking setting with the highest performance for a certain thermal envelope, or other criteria. To do so, in block 418 the master computing device 102a compares the overclocking setting of the master computing device 102a and the overclocking setting(s) of the slave computing device(s) 102b. As discussed above, the best overclocking setting is indicative of the best possible overclocking performance that can be achieved among the master computing device 102a and all the slave computing devices 102b in the network 104. In some embodiments, in block 420 the master computing device 102a may further resolve any overclocking error(s) of the slave computing device(s) 102b. For example, the master computing device 102a may resolve errors if a slave computing device 102b fails to send an acknowledgement that an overclocking setting was implemented successfully, as described further below in connection with block 426.

Once the master computing device 102a determines the best overclocking setting that can be achieved among the computing devices 102 within the network 104, in block 422 the master computing device 102a advertises the best overclocking setting to the slave computing device(s) 102b. In some embodiments, in block 424 the master computing device 102a may command the slave computing device(s) 102b to implement the best overclocking setting advertised to the slave computing device(s) 102b. Subsequent to advertising the best overclocking setting, in block 426 the master computing device 102a may determine whether each slave computing device 102b has successfully implemented the best overclocking setting advertised by the master computing device 102a. For example, the master computing device 102a may determine whether each slave computing device 102b has sent an acknowledgement indicating that it has successfully implemented the best overclocking setting. In some embodiments, the master computing device 102a may monitor or track whether the best overclocking setting advertised by the master computing device 102a has been implemented by each slave computing device 102b. After advertising and monitoring the best overclocking settings, the method 400 loops back to block 402 to periodically or continually identify and broadcast the master time clock and overclocking setting to the slave computing devices 102b.

Figure 5:
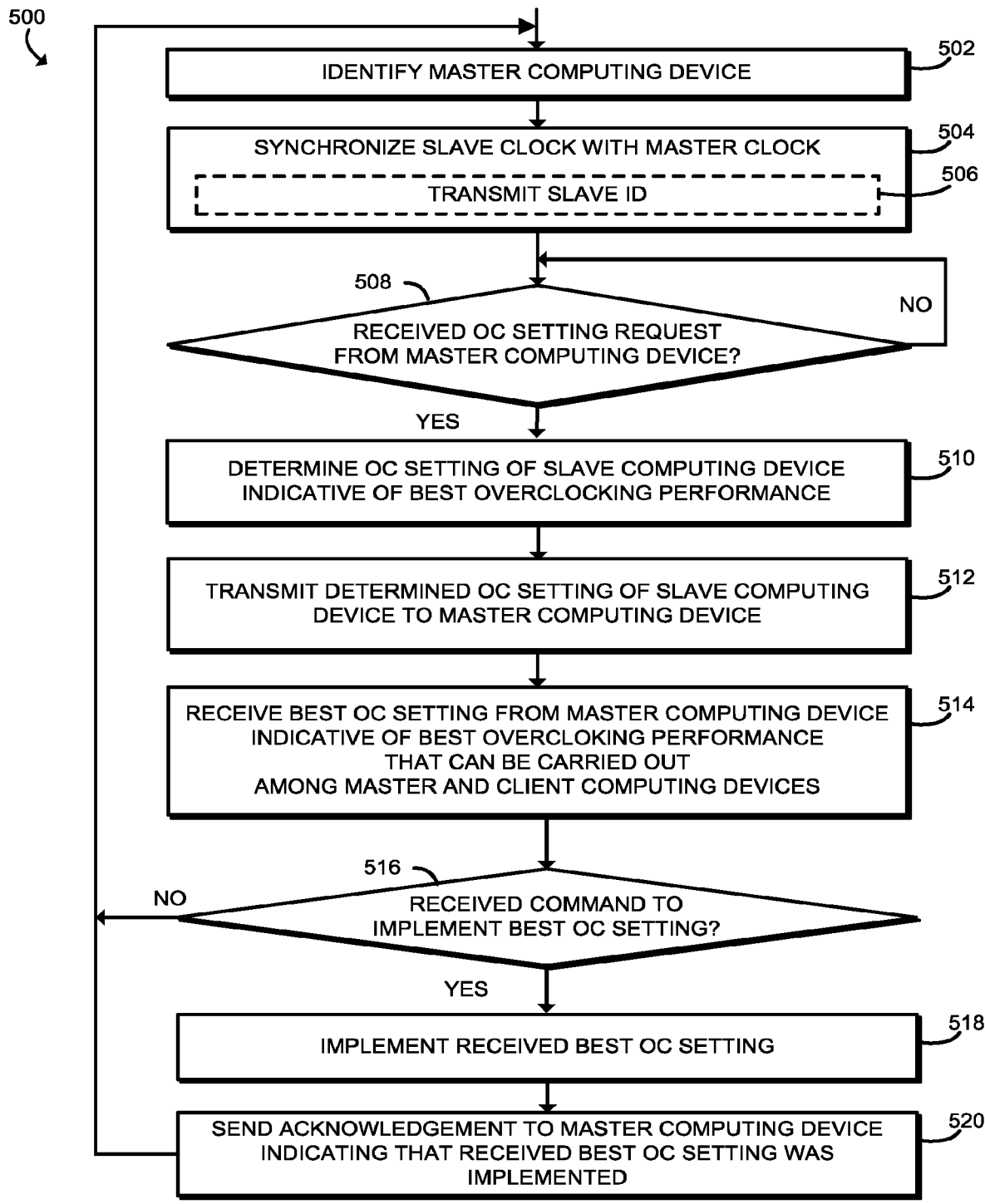
FIG. 5 is a simplified flow diagram of at least one embodiment of a method for achieving synchronized overclocking setting that may be executed by the slave computing device of FIGS. 1 and 3.

Referring now to FIG. 5, in use, a slave computing device 102b may execute a method 500 for synchronizing an overclocking setting with the master computing device 102a. The method 500 begins with block 502 in which the slave computing device 102b identifies a master computing device 102a. The master computing device 102a may be identified using a time synchronization protocol such as IEEE 1588, as described above. Subsequent to identifying the master computing device 102a, in block 504 the slave computing device 102b synchronizes its slave clock with the master time clock of the master computing device 102a. In some embodiments, in block 506 the slave computing device 102b may transmit an identification of the slave computing device 102b to the master computing device 102a such that the master computing device 102a can identify and monitor each slave computing device 102b in the network 104.

In block 508, the slave computing device 102b determines whether the slave computing device 102b has received a request from the master computing device 102a for transmission of an overclocking setting of the slave computing device 102b. In some embodiments, the slave computing device 102b may also receive a request from the master computing device 102a to enable an overclocking mode to allow the slave computing device 102b to determine the overclocking setting of the slave computing device 102b. If no request has been received from the master computing device 102a, the method 500 loops back to block 508 in which the slave computing device 102b continues to monitor for an overclocking setting request from the master computing device 102a. If the slave computing device 102b determines that an overclocking setting request has been received from the master computing device 102a, the method 500 advances to block 510.

In block 510, subsequent to receiving the overclocking setting request, the slave computing device 102b determines an overclocking setting of the slave computing device 102b. The overclocking setting of the slave computing device 102b is indicative of a best overclocking performance that can be achieved by the slave computing device 102b. Once the slave computing device 102b determines its overclocking setting, in block 512 the slave computing device 102b transmits the overclocking setting of the slave computing device 102b to the master computing device 102a. It should be appreciated that, in some embodiments, the slave computing device 102b may transmit its overclocking setting without receiving any request from the master computing device 102a.

In block 514, the slave computing device 102b receives a best overclocking setting from the master computing device 102a indicative of a best overclocking performance that can be carried out among the master computing device 102a and the slave computing device 102b. Subsequently, in block 516, the slave computing device 102b determines whether the slave computing device 102b received a command to implement the best overclocking setting received from the master computing device 102a. If not, the method 500 loops back to block 502 in which the slave computing device 102b continues to identify a master computing device 102a by monitoring messages received from the computing devices 102. If the slave computing device 102b received the command from the master computing device 102a to implement the best overclocking setting, the method 500 advances to block 518, in which the slave computing device 102b implements the best overclocking setting received from the master computing device 102a. It should be appreciated, however, that the slave computing device 102b may implement the best overclocking setting received from the master computing device 102a without receiving a separate command from the master computing device 102a. Once the slave computing device 102b implements the best overclocking setting, in block 520 the slave computing device 102b sends an acknowledgement to the master computing device 102a indicating that the best overclocking setting was successfully implemented. The method 500 then loops back to block 502 to continue to identify a master computing device 102a by monitoring messages received from the computing devices 102. It should be appreciated that, in some embodiments, the slave computing device 102b may periodically or continually identify the master computing device 102a to synchronize with master time clock.

It should be appreciated that, in some embodiments, the methods 400 and/or 500 may be embodied as various instructions stored on a computer-readable media, which may be executed by the processor 120, the I/O subsystem 124, and/or other components of the computing device 102 to cause the computing device 102 to perform the respective method 400 and/or 500. The computer-readable media may be embodied as any type of media capable of being read by the computing device 102 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a master computing device to synchronize overclocking parameters between multiple computing devices, the master computing device comprising a time clock synchronizer to establish a connection between the master computing device and a plurality of slave computing devices; an overclocking setting determiner to determine a first overclocking setting of the master computing device, wherein the first overclocking setting is indicative of a best overclocking performance that can be achieved by the master computing device; an overclocking setting manager to: (i) receive a second overclocking setting of a first slave computing device of the plurality of slave computing devices from the first slave computing device via the connection between the master computing device and the first slave computing device, wherein the second overclocking setting is indicative of a best overclocking performance that can be achieved by the first slave computing device; and (ii) determine a best overclocking setting of the first overclocking setting and the second overclocking setting; and an overclocking setting reporter to advertise the best overclocking setting to the plurality of slave computing devices.

Example 2 includes the subject matter of Example 1, and wherein to establish a connection between the master computing device and the slave computing devices comprises to identify a time clock of the master computing device as a master time clock; and synchronize the slave computing devices with the master time clock.

Example 3 includes the subject matter of any of Examples 1 and 2, and wherein an overclocking setting manager is further to receive a third overclocking setting of a second slave computing device from the second slave computing device via the connection between the master computing device and the second slave computing device, wherein the second overclocking setting is indicative of best overclocking performance that can be achieved by the second slave computing device.

Example 4 includes the subject matter of any of Examples 1-3, and wherein to determine the best overclocking setting further comprises to determine the best overclocking setting of the first overclocking setting, the second overclocking setting, and the third overclocking setting.

Example 5 includes the subject matter of any of Examples 1-4, and wherein the overclocking setting manager is further to request the first slave computing device to provide the second overclocking setting via the connection between the master computing device and the first slave computing device, wherein to receive the second overclocking setting comprises to receive the second overclocking setting in response to a request to the first slave computing device to provide the second overclocking setting.

Example 6 includes the subject matter of any of Examples 1-5, and wherein to determine the best overclocking setting comprises to compare the first overclocking setting of the master computing device and the second overclocking setting received from the first slave computing device.

Example 7 includes the subject matter of any of Examples 1-6, and wherein to compare the first overclocking setting and the second overclocking setting comprises to compare an overclocking parameter of the first overclocking setting and the overclocking parameter of the second overclocking setting.

Example 8 includes the subject matter of any of Examples 1-7, and wherein the overclocking parameter comprises an operating clock frequency of a processor of the computing device.

Example 9 includes the subject matter of any of Examples 1-8, and wherein the overclocking parameter comprises an operating voltage of a processor of the computing device.

Example 10 includes the subject matter of any of Examples 1-9, and wherein the overclocking parameter comprises a number of processor cores.

Example 11 includes the subject matter of any of Examples 1-10, and wherein the overclocking parameter comprises a core ratio.

Example 12 includes the subject matter of any of Examples 1-11, and wherein the overclocking parameter comprises a turbo status.

Example 13 includes the subject matter of any of Examples 1-12, and wherein to determine the best overclocking setting comprises to select one overclocking setting among the first overclocking setting and the second overclocking setting to achieve best overclocking performance possible among the master computing device and the slave computing devices.

Example 14 includes the subject matter of any of Examples 1-13, and further including an overclocking setting database to store the best overclocking setting advertised to the slave computing devices.

Example 15 includes the subject matter of any of Examples 1-14, and, wherein the overclocking setting reporter is further to request the first slave computing device to implement the best overclocking setting advertised to the slave computing devices.

Example 16 includes the subject matter of any of Examples 1-15, and further including an overclocking setting monitor to determine whether the first slave computing device has implemented the best overclocking setting advertised to the slave computing devices in response to a request to the first slave computing device to implement the best overclocking setting.

Example 17 includes the subject matter of any of Examples 1-16, and further including an overclocking setting monitor to monitor the overclocking performance of the master computing device and the overclocking performance of the first slave computing device in response to advertisement of the best overclocking setting.

Example 18 includes the subject matter of any of Examples 1-17, and further including an overclocking setting updater to determine whether the best overclocking setting advertised to the slave computing devices is different from the first overclocking setting; and implement the best overclocking setting in response to a determination that the best overclocking setting advertised to the slave computing devices is different than the first overclocking setting.

Example 19 includes a slave computing device to synchronize overclocking parameters between multiple computing devices, the slave computing device comprising a time clock synchronizer to establish a connection between the slave computing device and a master computing device; an overclocking setting determiner to determine an overclocking setting of the slave computing device, wherein the overclocking setting is indicative of a best overclocking performance that can be achieved by the slave computing device; and an overclocking setting manager to: (i) transmit the overclocking setting of the slave computing device to the master computing device via the connection between the slave computing device and the master computing device; and (ii) receive a best overclocking setting from the master computing device in response to transmission of the overclocking setting.

Example 20 includes the subject matter of Example 19, and wherein the overclocking setting manager is further to receive a request from the master computing device for the overclocking setting of the slave computing device via the connection between the slave computing device and the master computing device; and to transmit the overclocking setting of the slave computing device comprises to transmit the overclocking setting of the slave computing device in response to receipt of the request from the master computing device for the overclocking setting of the slave computing device.

Example 21 includes the subject matter of any of Examples 19 and 20, and further including an overclocking setting updater to (i) receive a request from the master computing device to implement the best overclocking setting received from the master computing device on the slave computing device and (ii) implement the best overclocking setting in response to receipt of the request.

Example 22 includes a method for synchronized overclock parameters between multiple computing devices, the method comprising establishing a connection between a master computing device and a plurality of slave computing devices; determining, by the master computing device, a first overclocking setting of the master computing device, wherein the first overclocking setting is indicative of best overclocking performance that can be achieved by the master computing device; receiving, by the master computing device, a second overclocking setting of a first slave computing device of the plurality of slave computing devices from the first slave computing device via the connection between the master computing device and the first slave computing device, wherein the second overclocking setting is indicative of best overclocking performance that can be achieved by the first slave computing device; determining, by the master computing device, a best overclocking setting of the first overclocking setting and the second overclocking setting; and advertising, by the master computing device, the best overclocking setting to the plurality of slave computing devices.

Example 23 includes the subject matter of Example 22, and wherein establishing the connection between the master computing device and the slave computing devices comprises identifying a time clock of the master computing device as a master time clock; and synchronizing the slave computing devices with the master time clock.

Example 24 includes the subject matter of any of Examples 22 and 23, and further including receiving, by the master computing device, a third overclocking setting of a second slave computing device from the second slave computing device via the connection between the master computing device and the second slave computing device, wherein the second overclocking setting is indicative of best overclocking performance that can be achieved by the second slave computing device.

Example 25 includes the subject matter of any of Examples 22-24, and wherein determining the best overclocking setting further comprises determining the best overclocking setting of the first overclocking setting, the second overclocking setting, and the third overclocking setting.

Example 26 includes the subject matter of any of Examples 22-25, and further including requesting, by the master computing device, the first slave computing device to provide the second overclocking setting via the connection between the master computing device and the first slave computing device; wherein receiving the second overclocking setting comprises receiving the second overclocking setting in response to requesting the first slave computing device to provide the second overclocking setting.

Example 27 includes the subject matter of any of Examples 22-26, and wherein determining the best overclocking setting comprises comparing the first overclocking setting of the master computing device and the second overclocking setting received from the first slave computing device.

Example 28 includes the subject matter of any of Examples 22-27, and wherein comparing the first overclocking setting and the second overclocking setting comprises comparing an overclocking parameter of the first overclocking setting and the overclocking parameter of the second overclocking setting.

Example 29 includes the subject matter of any of Examples 22-28, and wherein the overclocking parameter comprises an operating clock frequency of a processor of the computing device.

Example 30 includes the subject matter of any of Examples 22-29, and wherein the overclocking parameter comprises an operating voltage of a processor of the computing device.

Example 31 includes the subject matter of any of Examples 22-30, and wherein the overclocking parameter comprises a number of processor cores.

Example 32 includes the subject matter of any of Examples 22-31, and wherein the overclocking parameter comprises a core ratio.

Example 33 includes the subject matter of any of Examples 22-32, and wherein the overclocking parameter comprises a turbo status.

Example 34 includes the subject matter of any of Examples 22-33, and wherein determining the best overclocking setting comprises selecting one overclocking setting among the first overclocking setting and the second overclocking setting to achieve best overclocking performance possible among the master computing device and the slave computing devices.

Example 35 includes the subject matter of any of Examples 22-34, and further including storing, by the master computing device, the best overclocking setting advertised to the slave computing devices.

Example 36 includes the subject matter of any of Examples 22-35, and further including requesting, by the master computing device, the first slave computing device to implement the best overclocking setting advertised to the slave computing devices.

Example 37 includes the subject matter of any of Examples 22-36, and further including determining, by the master computing device, whether the first slave computing device has implemented the best overclocking setting advertised to the slave computing devices in response to requesting the first slave computing device to implement the best overclocking setting.

Example 38 includes the subject matter of any of Examples 22-37, and further including monitoring, by the master computing device, the overclocking performance of the master computing device and the overclocking performance of the first slave computing device in response to advertising the best overclocking setting.

Example 39 includes the subject matter of any of Examples 22-38, and further including determining, by the master computing device, whether the best overclocking setting advertised to the slave computing devices is different from the first overclocking setting; and implementing, by the master computing device, the best overclocking setting in response to determining that the best overclocking setting advertised to the slave computing devices is different than the first overclocking setting.

Example 40 includes a method to synchronize overclocking parameters between multiple computing devices, the method comprising establishing, by a slave computing device, a connection between the slave computing device and a master computing device; determining, by the slave computing device, an overclocking setting of the slave computing device, wherein the overclocking setting is indicative of a best overclocking performance that can be achieved by the slave computing device; transmitting, by the slave computing device, the overclocking setting of the slave computing device to the master computing device via the connection between the slave computing device and the master computing device; and receiving, by the slave computing device, a best overclocking setting from the master computing device in response to transmitting the overclocking setting.

Example 41 includes the subject matter of Example 40, and further including receiving, by the slave computing device, a request from the master computing device for the overclocking setting of the slave computing device via the connection between the slave computing device and the master computing device; wherein transmitting the overclocking setting of the slave computing device comprises transmitting the overclocking setting of the slave computing device in response to receiving the request from the master computing device for the overclocking setting of the slave computing device.

Example 42 includes the subject matter of any of Examples 40 and 41, and further including receiving, by the slave computing device, a request from the master computing device to implement the best overclocking setting received from the master computing device on the slave computing device; and implementing, by the slave computing device, the best overclocking setting in response to receiving the request.

Example 43 includes a computing device comprising a processor; and a memory having stored therein a plurality of instructions that when executed by the processor cause the computing device to perform the method of any of Examples 22-42.

Example 44 includes one or more machine readable storage media comprising a plurality of instructions stored thereon that in response to being executed result in a computing device performing the method of any of Example 22-42.

Example 45 includes a computing device comprising means for performing the method of any of Examples 22-42.

Example 46 includes a master computing device to synchronize overclocking parameters between multiple computing devices, the master computing device comprising means for establishing a connection between the master computing device and a plurality of slave computing devices; means for determining a first overclocking setting of the master computing device, wherein the first overclocking setting is indicative of best overclocking performance that can be achieved by the master computing device; means for receiving a second overclocking setting of a first slave computing device of the plurality of slave computing devices from the first slave computing device via the connection between the master computing device and the first slave computing device, wherein the second overclocking setting is indicative of best overclocking performance that can be achieved by the first slave computing device; means for determining a best overclocking setting of the first overclocking setting and the second overclocking setting; and means for advertising the best overclocking setting to the plurality of slave computing devices.

Example 47 includes the subject matter of Example 46, and wherein the means for establishing the connection between the master computing device and the slave computing devices comprises means for identifying a time clock of the master computing device as a master time clock; and means for synchronizing the slave computing devices with the master time clock.

Example 48 includes the subject matter of any of Examples 46 and 47, and further including means for receiving a third overclocking setting of a second slave computing device from the second slave computing device via the connection between the master computing device and the second slave computing device, wherein the second overclocking setting is indicative of best overclocking performance that can be achieved by the second slave computing device.

Example 49 includes the subject matter of any of Examples 46-48, and wherein the means for determining the best overclocking setting further comprises means for determining the best overclocking setting of the first overclocking setting, the second overclocking setting, and the third overclocking setting.

Example 50 includes the subject matter of any of Examples 46-49, and further including means for requesting the first slave computing device to provide the second overclocking setting via the connection between the master computing device and the first slave computing device; wherein the means for receiving the second overclocking setting comprises means for receiving the second overclocking setting in response to requesting the first slave computing device to provide the second overclocking setting.

Example 51 includes the subject matter of any of Examples 46-50, and wherein the means for determining the best overclocking setting comprises means for comparing the first overclocking setting of the master computing device and the second overclocking setting received from the first slave computing device.

Example 52 includes the subject matter of any of Examples 46-51, and wherein the means for comparing the first overclocking setting and the second overclocking setting comprises means for comparing an overclocking parameter of the first overclocking setting and the overclocking parameter of the second overclocking setting.

Example 53 includes the subject matter of any of Examples 46-52, and wherein the overclocking parameter comprises an operating clock frequency of a processor of the computing device.

Example 54 includes the subject matter of any of Examples 46-53, and wherein the overclocking parameter comprises an operating voltage of a processor of the computing device.

Example 55 includes the subject matter of any of Examples 46-54, and wherein the overclocking parameter comprises a number of processor cores.

Example 56 includes the subject matter of any of Examples 46-55, and wherein the overclocking parameter comprises a core ratio.

Example 57 includes the subject matter of any of Examples 46-56, and wherein the overclocking parameter comprises a turbo status.

Example 58 includes the subject matter of any of Examples 46-57, and wherein the means for determining the best overclocking setting comprises means for selecting one overclocking setting among the first overclocking setting and the second overclocking setting to achieve best overclocking performance possible among the master computing device and the slave computing devices.

Example 59 includes the subject matter of any of Examples 46-58, and further including means for storing the best overclocking setting advertised to the slave computing devices.

Example 60 includes the subject matter of any of Examples 46-59, and further including means for requesting the first slave computing device to implement the best overclocking setting advertised to the slave computing devices.

Example 61 includes the subject matter of any of Examples 46-60, and further including means for determining whether the first slave computing device has implemented the best overclocking setting advertised to the slave computing devices in response to requesting the first slave computing device to implement the best overclocking setting.

Example 62 includes the subject matter of any of Examples 46-61, and further including means for monitoring the overclocking performance of the master computing device and the overclocking performance of the first slave computing device in response to advertising the best overclocking setting.

Example 63 includes the subject matter of any of Examples 46-62, and further including means for determining whether the best overclocking setting advertised to the slave computing devices is different from the first overclocking setting; and means for implementing the best overclocking setting in response to determining that the best overclocking setting advertised to the slave computing devices is different than the first overclocking setting.

Example 64 includes a slave computing device to synchronize overclocking parameters between multiple computing devices, the slave computing device comprising means for establishing a connection between the slave computing device and a master computing device; means for determining an overclocking setting of the slave computing device, wherein the overclocking setting is indicative of a best overclocking performance that can be achieved by the slave computing device; means for transmitting the overclocking setting of the slave computing device to the master computing device via the connection between the slave computing device and the master computing device; and means for receiving a best overclocking setting from the master computing device in response to transmitting the overclocking setting.

Example 65 includes the subject matter of Example 64, and further including means for receiving a request from the master computing device for the overclocking setting of the slave computing device via the connection between the slave computing device and the master computing device; wherein the means for transmitting the overclocking setting of the slave computing device comprises means for transmitting the overclocking setting of the slave computing device in response to receiving the request from the master computing device for the overclocking setting of the slave computing device.

Example 66 includes the subject matter of any of Examples 64 and 65, and further including means for receiving a request from the master computing device to implement the best overclocking setting received from the master computing device on the slave computing device; and means for implementing the best overclocking setting in response to receiving the request.

The invention claimed is:

1. A computing device to synchronize overclocking parameters between multiple computing devices, the computing device comprising:
    communication circuitry to establish network connectivity between the computing device and one or more peer computing devices in a network;
    a time clock synchronizer to establish a connection between the computing device and a first master computing device;
    an overclocking setting determiner to determine an overclocking setting of the computing device, wherein the overclocking setting is indicative of a best overclocking performance that can be achieved by the computing device; and
    an overclocking setting manager to: (i) transmit the overclocking setting of the computing device to the first master computing device via the connection between the computing device and the first master computing device; and (ii) receive a best overclocking setting from the first master computing device in response to transmission of the overclocking setting;
    wherein the time clock synchronizer is further to identify the computing device as a second master computing device in response to receipt of the best overclocking setting from the first master computing device; and
    wherein the computing device further comprises an overclocking setting reporter to advertise the best overclocking setting to the one or more peer computing devices in response to identification of the computing device as the second master computing device.

2. The computing device of claim 1, wherein:
    the overclocking setting manager is further to receive a request from the first master computing device for the overclocking setting of the computing device via the connection between the computing device and the first master computing device; and
    to transmit the overclocking setting of the computing device comprises to transmit the overclocking setting of the computing device in response to receipt of the request from the first master computing device for the overclocking setting of the computing device.

3. The computing device of claim 1, further comprising an overclocking setting updater to (i) receive a request from the first master computing device to implement the best overclocking setting received from the first master computing device on the computing device and (ii) implement the best overclocking setting in response to receipt of the request.

4. The computing device of claim 1, further comprising an overclocking setting database to store the best overclocking setting.

5. The computing device of claim 1, wherein the overclocking setting reporter is further to request each of the one or more peer computing devices to implement the best overclocking setting advertised to the one or more peer computing devices.

6. The computing device of claim 5, further comprising an overclocking setting monitor to determine whether each of the one or more peer computing devices has implemented the best overclocking setting advertised to the one or more peer computing devices.

7. The computing device of claim 1, wherein the overclocking setting comprises an operating clock frequency of a processor of the computing device.

8. A method to synchronize overclocking parameters between multiple computing devices, the method comprising:
    establishing, by a computing device, network connectivity between the computing device and one or more peer computing devices in a network;
    establishing, by the computing device, a connection between the computing device and a first master computing device;
    determining, by the computing device, an overclocking setting of the computing device, wherein the overclocking setting is indicative of a best overclocking performance that can be achieved by the computing device;
    transmitting, by the computing device, the overclocking setting of the computing device to the first master computing device via the connection between the computing device and the first master computing device;
    receiving, by the computing device, a best overclocking setting from the first master computing device in response to transmitting the overclocking setting;
    identifying, by the computing device, the computing device as a second master computing device in response to receiving the best overclocking setting from the first master computing device; and
    advertising, by the computing device, the best overclocking setting to the one or more peer computing devices in response to identifying the computing device as the second master computing device.

9. The method of claim 8, further comprising:
    receiving, by the computing device, a request from the first master computing device for the overclocking setting of the computing device via the connection between the computing device and the first master computing device;
    wherein transmitting the overclocking setting of the computing device comprises transmitting the overclocking setting of the computing device in response to receiving the request from the first master computing device for the overclocking setting of the computing device.

10. The method of claim 8, further comprising:
    receiving, by the computing device, a request from the first master computing device to implement the best overclocking setting received from the first master computing device on the computing device; and
    implementing, by the computing device, the best overclocking setting in response to receiving the request.

11. The method of claim 8, further comprising storing, by the computing device, the best overclocking setting with an overclocking setting database.

12. The method of claim 8, further comprising requesting, by the computing device, each of the one or more peer computing devices to implement the best overclocking setting advertised to the one or more peer computing devices.

13. The method of claim 12, further comprising determining, by the computing device, whether each of the one or more peer computing devices has implemented the best overclocking setting advertised to the one or more peer computing devices.

14. One or more computer-readable storage media comprising a plurality of instructions that in response to being executed cause a master computing device to:
- establish network connectivity between the computing device and one or more peer computing devices in a network;
- establish a connection between the computing device and a first master computing device;
- determine an overclocking setting of the computing device, wherein the overclocking setting is indicative of a best overclocking performance that can be achieved by the computing device;
- transmit the overclocking setting of the computing device to the first master computing device via the connection between the computing device and the first master computing device;
- receive a best overclocking setting from the first master computing device in response to transmitting the overclocking setting;
- identify the computing device as a second master computing device in response to receiving the best overclocking setting from the first master computing device; and
- advertise the best overclocking setting to the one or more peer computing devices in response to identifying the computing device as the second master computing device.

15. The one or more computer-readable storage media of claim 14, further comprising a plurality of instructions that in response to being executed cause the master computing device to:
- receive a request from the first master computing device for the overclocking setting of the computing device via the connection between the computing device and the first master computing device;
- wherein to transmit the overclocking setting of the computing device comprises to transmit the overclocking setting of the computing device in response to receiving the request from the first master computing device for the overclocking setting of the computing device.

16. The one or more computer-readable storage media of claim 14, further comprising a plurality of instructions that in response to being executed cause the master computing device to:
- receive a request from the first master computing device to implement the best overclocking setting received from the first master computing device on the computing device; and
- implement the best overclocking setting in response to receiving the request.

17. The one or more computer-readable storage media of claim 14, further comprising a plurality of instructions that in response to being executed cause the master computing device to store the best overclocking setting with an overclocking setting database.

18. The one or more computer-readable storage media of claim 14, further comprising a plurality of instructions that in response to being executed cause the master computing device to request each of the one or more peer computing devices to implement the best overclocking setting advertised to the one or more peer computing devices.

19. The one or more computer-readable storage media of claim 18, further comprising a plurality of instructions that in response to being executed cause the master computing device to determine whether each of the one or more peer computing devices has implemented the best overclocking setting advertised to the one or more peer computing devices.

20. The one or more computer-readable storage media of claim 14, wherein the overclocking setting comprises an operating clock frequency of a processor of the computing device.

* * * * *